United States Patent [19]
Fischbeck

[11] 4,386,358
[45] May 31, 1983

[54] INK JET PRINTING USING ELECTROSTATIC DEFLECTION

[75] Inventor: Kenneth H. Fischbeck, Dallas, Tex.
[73] Assignee: Xerox Corporation, Stamford, Conn.

[21] Appl. No.: 304,493
[22] Filed: Sep. 22, 1981
[51] Int. Cl.[3] .............. G01D 15/16
[52] U.S. Cl. .............. 346/1.1; 346/140 R
[58] Field of Search .............. 346/140 R, 75, 139 R, 346/1.1; 400/126

[56] References Cited

U.S. PATENT DOCUMENTS 3,136,594 6/1964 Ascoli .............. 346/1.1
3,871,004 3/1975 Rittberg .............. 346/75
3,938,163 2/1976 Fujimoto .............. 346/75
4,138,688 2/1979 Heard .............. 346/75
4,314,282 2/1982 Fischbeck .............. 358/286
4,322,063 3/1982 Fischbeck .............. 267/160
4,349,828 9/1982 Fischbeck .............. 346/1.1

*Primary Examiner*—Joseph W. Hartary
*Attorney, Agent, or Firm*—Richard A. Tomlin

[57] ABSTRACT

Electrostatic deflection is used in an oscillating bar drop-on-demand ink jet printer to compensate for about one half of the droplet displacement caused by bar velocity. The disclosed system provides a method for printing that is not sensitive to variations in ink droplet ejection velocity.

3 Claims, 7 Drawing Figures

INK JET PRINTING USING ELECTROSTATIC DEFLECTION

The invention relates to an oscillating bar drop-on-demand ink jet printer where printing occurs while the bar is moving bidirectionally. When using an oscillating bar printer, the placement of drops on the record-receiving surface is determined by the timing of the droplet ejection, by the velocity of the bar at the time of drop ejection, by the distance between the ink jet nozzle and the record-receiving surface and by the velocity of the ejected droplet. Bar velocity is easily measured, and ink jet nozzle to record-receiving surface distance is fixed. This means that if the velocity of the droplets ejected were constant, the accurate timing of droplet ejection could result in precise droplet placement. It has been found, however, that droplet velocity is difficult to measure in a dynamic printing situation and is known to fluctuate.

Specifically, the invention relates to a method of correcting drop placement errors caused by fluctuations in ink droplet velocity. Where a figure such as a vertical edge is being formed by droplets expressed while the bar is moving in both directions, the offset in drop placement caused by fluctuation in drop velocity can give the resulting character or figure a jagged appearance. This can create a print quality problem. To minimize this problem, electrostatic droplet deflection is utilized to counter the placement error caused by fluctuation in droplet velocity.

The foregoing advantages and features of the present invention will be apparent from the following more particular description of a preferred embodiment as illustrated in the accompanying drawing wherein:

FIG. 2 shows how the droplets can appear on a record surface where bar droplet velocity is not compensated for.

Figure 1A:
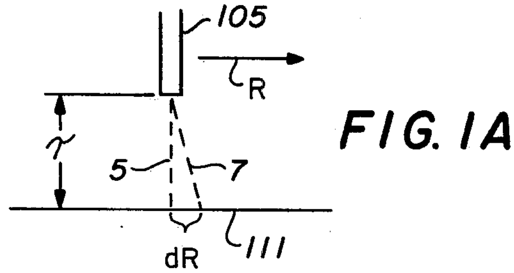
FIGS. 1A and 1B illustrate how the velocity of the moving bar causes droplet offset on the record surface.
Figure 1B:
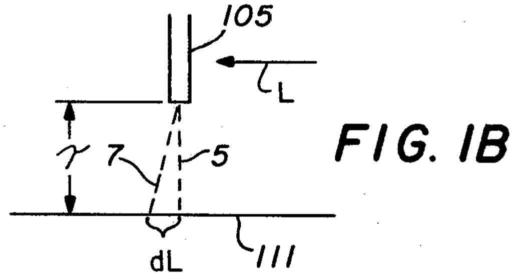

Referring now to FIG. 1A, ink jet nozzle 105 mounted on an oscillating bar (not shown) is moving in the direction shown by arrow R. When a droplet is ejected from nozzle 105 in response to an electrical signal operating on a transducer (not shown), the droplet, instead of moving directly to record surface 111 along path 5, follows a trajectory represented by line 7 resulting in offset dR because the velocity of the bar is imparted to the ejected droplet. Similarly, FIG. 1B shows ink jet nozzle 105 moving in direction L resulting in velocity induced position offset dL. Where a single figure is produced by droplets expressed from ink jet nozzle 105 moving in both directions R and L, i.e., bidirectional printing, the resulting image will have droplets offset from each other by a distance of as much as dR plus dL.

Figure 2:
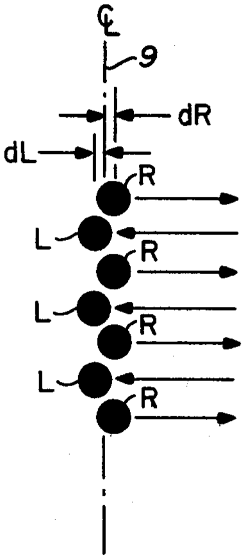

In FIG. 2, centerline 9 represents the centerline of droplet positions where they would impact the record surface 111 (see FIGS. 1A and 1B) if there was no bar velocity induced droplet offset. It should be pointed out here that the oscillating bar of this invention oscillates at between 5 and 60 Hz. The bar velocity varies between 0 and about 30 inches/second during each cycle. The amount of offset is also affected by the distance between nozzle 105 and record surface 111 as can readily be understood.

The droplets, where no bar velocity induced droplet offset occurs, follow path 5 (see FIGS. 1A and 1B). Dots R, however, represent the droplet positions on record surface 111 (see FIGS. 1A and 1B) where nozzle 105 is moving in the direction R as shown in FIG. 1A when droplets are being ejected. Dots L show the position of droplets on record surface 111 resulting from the direction L movement of ink jet nozzle 105 being imparted to droplets ejected from nozzle 105. dR and dL again represent the bar velocity imparted droplet offset. It can be seen that, where a single figure, represented as a vertical line in FIG. 2, is formed by an ink jet nozzle printing bidirectionally, a jagged appearance can result. Of course, this bar velocity imparted droplet offset can be compensated for electronically by properly programming the pulse transducer controller for ink ejection. Specifically, such offset can be compensated for by measuring bar velocity and direction and adjusting the timing of droplet ejection accordingly or by electrostatic deflection as disclosed in my copending, commonly assigned application D/80337 filed concurrently herewith and entitled "A Method for Ink Jet Printing". The concept of that application is based on having a droplet velocity which is reasonably accurately known and constant. Such systems, however, to be effective require information regarding bar velocity ink jet nozzle to record-receiving surface distance and in droplet ejection velocity.

Figure 3:
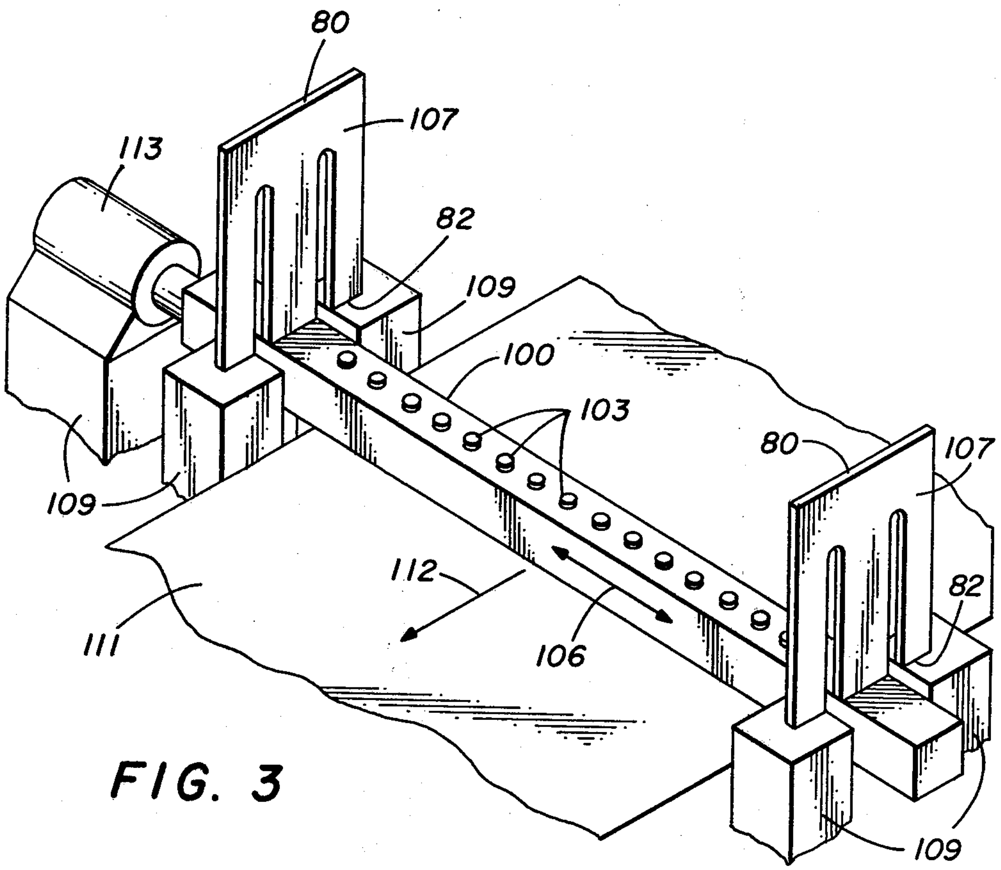
FIG. 3 is a perspective view of an oscillating bar printer in which the present invention is useful.

Referring now to FIG. 3, there is shown an oscillating bar printer. Specifically, there is shown an oscillating bar, referred to hereinafter as a raster input scan/-raster output scan (RIS/ROS) support member 100, which may be, for example, of a plastic material. Supported by RIS/ROS member 100 are scanning/reading means represented here by discs 103, which may be, by way of example, photodetectors. Also supported by RIS/ROS support member 100 are marking elements 105 (see FIG. 4), which, in this exemplary instance, are drop-on-demand ink jets. Conveniently, one marking element 105 can be provided for each reading element 103; however, this is not necessary. RIS/ROS support member 100 is suspended for axial oscillatory movement in the directions shown by arrow 106 by flexure mounts 107, which act as multiple compounded cantilever springs around edge 80, but edge 80 pivots around edge 82. That is, not only does the support member 100 pivot, this double pivoting action keeps RIS/ROS support member 100 in spaced relationship to record-receiving member 111 with a minimum amount of swing or arc over its complete travel. RIS/ROS support member 100 is oscillated by oscillating means 113, which may be, for example, a solenoid. Solenoid 113 is also fixed to base 109 as are flexure mounts 107.

Figure 4:
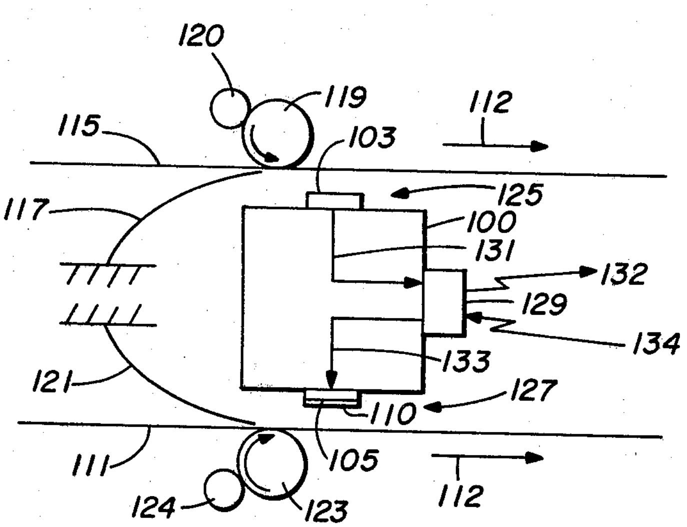
FIG. 4 is a side-sectional schematic representation of the oscillating bar printer of FIG. 3.

Referring now to FIG. 4, which is a schematic side view of the oscillating bar printer of FIG. 3 with the base 109 and flexure mounts 107 not shown for purposes of clarity. Document 115, which is to be scanned by photodetectors 103, is guided by leaf-spring fingers 117 into contact with drive guide roller means 119, which, when driven by motor 120, pulls document 115 across the reading path of photodectors 103 through image-reading station designated generally as 125. Document 115 and roller 119 were not shown in FIG. 3 to simplify understanding of the construction of the oscillating bar printer. Leaf-spring fingers 121 are used to guide record-receiving member 111, which may be, for example, paper, into contact with drive guide roller 123. Roller 123 driven by motor 124 guides and pulls record-receiving member 111 through the image-marking station designated generally as 127. Controller 129 is used to receive the input signal 131 from the photodetectors 103 and to produce an output signal 133 to ink jets 105. Controller 129 is conveniently mounted on oscillating RIS/ROS support member 100.

Where the oscillating bar printer is used as a copier, a document 115 to be copied and a copy sheet 111 are fed into the nips formed by leaf-spring fingers 117 and drive roller 119 and leaf-spring fingers 121 and drive roller 123, respectively. Solenoid 113 is activated causing RIS/ROS support member 100 to vibrate or oscillate axially a distance approximately equal to the distance between phototdetectors 103 to ensure that all areas of document 115 are read or scanned. Drive roller motors 120 and 124 are activated causing rotation of rollers 119 and 123 in such manner that document 115 and record-receiving member 111 are advanced at about the same speed or in synchronizaion. That is, the document and copy may be advanced together either continuously or stepwise. Preferably, the document 115 and copy sheet 111 are moved continuously because less expensive drive means and less circuitry are required than for stepwise movement. As document 115 is advanced, it is scanned by photodetectors 103, which send signals 131 to controller 129. Controller 129, in response to input signals 131, provides output signals 133, which trigger the appropriate ink jets 105. In this manner, a copy is formed on sheet 111 corresponding to the document 115. Obviously, signals 134 could be provided from a remote source, for example, facsimile or computer devices, in which case photodetectors 103, document 115 and associated document feed apparatus would not be activated or required; or signals 132 could be transmitted to a remote device.

Figure 5:
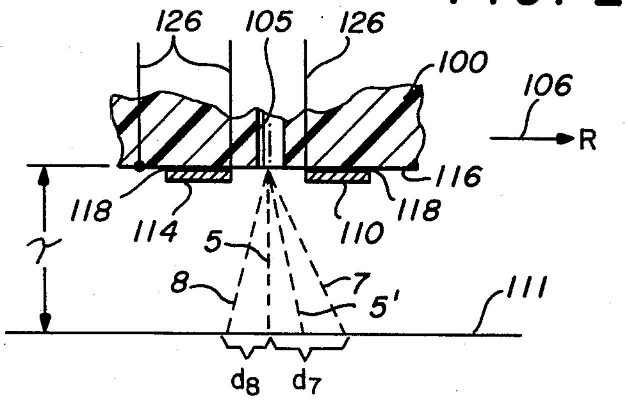
FIG.5 is a partial side-sectional view showing the present invention in greater detail.
Figure 6:
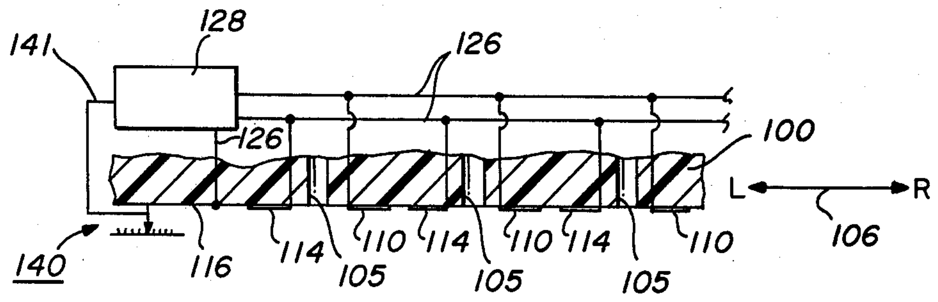
FIG. 6 is a partial side-sectional view of the oscillating bar member of FIG. 3 showing the electrostatic deflection means and velocity and direction sensor and control means.

Referring now to FIGS. 5 and 6, there is shown a partial side-sectional view representing a portion of RIS/ROS support member 100. Ink jet nozzle 105 expels droplets through conductive faceplate 116 formed on the ink jet nozzle side of RIS/ROS support member 100. Electrostatic deflection electrodes 110 and 114 are mounted on RIS/ROS support member 100 between ink jets 105 as shown in FIG. 6. That is, the ink jets 105 and electrodes 110 and 114 are aligned parallel to the axis of RIS/ROS support bar 100. Insulating material 118 (see FIG. 5) is placed between the electrodes 110, 114 and the conductive faceplate 116. Faceplate 116 and electrodes 110 and 114 are connected by electrical leads 126 to source of potential and controller 128. In my copending, commonly assigned application identified above, it is proposed to apply sufficient potential to electrodes 110 and 114 to cause droplets to follow a path that would provide a resultant path approximating path 5. This method is, however, sensitive to variations in droplet ejection velocity. For example, if droplet velocity decreases, compensating induced droplet offset must increase. Conversely, if droplet velocity increases, the compensating droplet offset decreases. A method has been found that is not sensitive to variations in droplet velocity. A detailed explanation thereof follows.

When the RIS/ROS support member 100 is moving to the right as seen in FIGS. 5 and 6, droplets emitted from droplet ejector nozzle 105 follow a line of travel to the right represented by line 7. To offset this bar velocity induced droplet offset, an electrical potential is applied between electrode 114 and faceplate 116. This potential difference is sufficient to cause the droplets to be deflected in a direction represented by line 8. That is, if the RIS/ROS support member 100 were standing still at the time a droplet were ejected, and if electrode 114 were activated, the droplet would follow a path represented by line 8, the potential difference being such that the distance $d_8$ is one half that of distance $d_7$. The resultant would accordingly follow path 5' in operation. The reason why deflection of the droplet only one half the distance of the droplet offset makes the system insensitive to variation in nozzle to record surface distance and to droplet velocity variations can be explained as follows.

Referring to FIG. 5, it is well known and has been repeatedly verified that the displacement of droplet impact from the point of droplet ejection from a moving transport varies directly with both the transport velocity and with the distance from the ejector 105 to the record-receiving surface 111, whereas it varies inversely with the droplet ejection velocity. The relationship can be expressed as:

$$d_7 \sim v_t \tau / v_d$$

where $d_7$ is the droplet offset, $v_t$ is the velocity of the transport or RIS/ROS support member 100 in this case, and $v_d$ is the velocity of the ejected droplet.

It is also well known and verified that the displacement of droplet impact on the record-receiving surface 111 from the point of droplet ejection when the droplet is inductively charged in a deflecting electric field varies directly with both thesquare of the electric field and the distance from the ejector nozzle 105 to the record-receiving surface 111, whereas it varies inversely with the square of the droplet velocity. This relationship can be expressed as:

$$d_8 \sim V_t^2 \tau^2 / v_d^2$$

where $d_8$ is the electrostatically induced droplet deflection, $V_t$ is the electrical potential applied to the droplet by the transport, i.e., RIS/ROS support member 100. Thus, to a first order, it may be said that displacement due to electrostatic deflection is twice as sensitive to drop velocity as is displacement due to transport velocity. Accordingly, if electrostatic deflection is made to oppose one half of the transport deflection, then the drop placement becomes insensitive to fluctuations in drop velocity to the first order. The remaining portion of placement error due to transport velocity may be compensated for as explained above in connection with FIGS. 1A and 1B.

Since the velocity of RIS/ROS support member 100 varies from O to $v_{max}$ and back again with each oscillation cycle, and since the direction changes from L to R for each oscillation cycle, it is necessary not only to alternate the electrode that is being activated, but the amount of potential applied should also be varied. More particularly, as RIS/ROS support member 100 moves to the right as seen in FIGS. 5 and 6, the velocity of the RIS/ROS support member 100 throws the drop ahead as represented by line 7 in FIG. 5. To minimize this RIS/ROS support member velocity induced droplet offset, electrodes 114, that is, the trailing electrodes, are activated to deflect the droplets back or to the left (as shown in FIGS. 5 and 6) along a line represented as 8. The resultant should approximate line 5. Similarly, when RIS/ROS support member 100 is moving to the left, electrodes 110, the trailing electrodes, are again activated. It can be seen that, because the velocity of RIS/ROS support member 100 varies from $v_o$ when RIS/ROS support member is at either extreme of its oscillation and increases to $v_{max}$ at the center point of its oscillation, it is necessary to accordingly vary the potential applied between electrode 114 and conductive faceplate 116. As an example, if a droplet is ejected when RIS/ROS support member is at the extreme left position of its travel, and the velocity is near $v_o$, little, if any, support member velocity induced droplet offset occurs; hence little, if any, potential need be applied. As the RIS/ROS support member 100 accelerates to the right and gains velocity, velocity induced droplet offset increases requiring that a greater potential be applied between electrodes 114 and faceplate 116. For best results, it is desirable to provide a linear encoder shown generally as 140 in FIG. 5 to determine the direction of travel and the velocity of RIS/ROS support member 100. The direction of travel and support member 100 velocity information derived from the linear encoder 140 is transmitted by line 141 to controller 128. Controller 128 reads the linear encoder input signal and controls the potential applied to lines 126 and hence to electrodes 114 and faceplate 116 or electrodes 110 and faceplate 116 depending on the direction of travel of RIS/ROS support member 100 and the amount of potential depending on RIS/ROS support member velocity.

Although specific components have been disclosed herein, many modifications and variations will occur to those skilled in the art. Such modifications and variations are intended to be included within the scope of the appended claims.

What is claimed is:

1. A method of correcting droplet placement errors caused by droplet ejection velocity variation in an oscillating bar ink jet printer, which comprises:

electrostatically deflecting droplets in a direction to compensate for approximately one-half of the bar velocity induced droplet placement error.

2. The method of claim 1 and further including the steps of:

providing a row of ink jet nozzles placed on said bar parallel to an axis of said bar;

providing a first and a second electrode, one on either side of each of said ink jet nozzles, and positioned between said nozzles in a line parallel to said axis of said oscillating bar;

providing direction sensor means for sensing the direction of movement of said oscillating bar; and providing control means responsive to said direction sensor means to apply electrical potential to the trailing electrode of said first and second electrodes.

3. The method of claim 2 and further including the steps of:

providing velocity sensor means for sensing the velocity of said oscillating bar; and providing control means responsive to said velocity sensor means to control the amount of potential applied to said trailing electrode.

* * * * *

UNITED STATES PATENT AND TRADEMARK OFFICE

CERTIFICATE OF CORRECTION

PATENT NO. : 4,386,358

DATED : May 31, 1983

INVENTOR(S) : Kenneth H. Fischbeck

It is certified that error appears in the above-identified patent and that said Letters Patent are hereby corrected as shown below:

Column 2, line 30, insert --, now U.S. Pat. No. 4,379,301, issued April 5, 1983-- immediately before the period.

Signed and Sealed this

*Eleventh* Day of *October 1983*

[SEAL]

*Attest:*

GERALD J. MOSSINGHOFF

*Attesting Officer* *Commissioner of Patents and Trademarks*